Aug. 9, 1960
P. A. SEAY
2,948,474
TANGENT COMPUTER CIRCUIT
Filed July 12, 1954
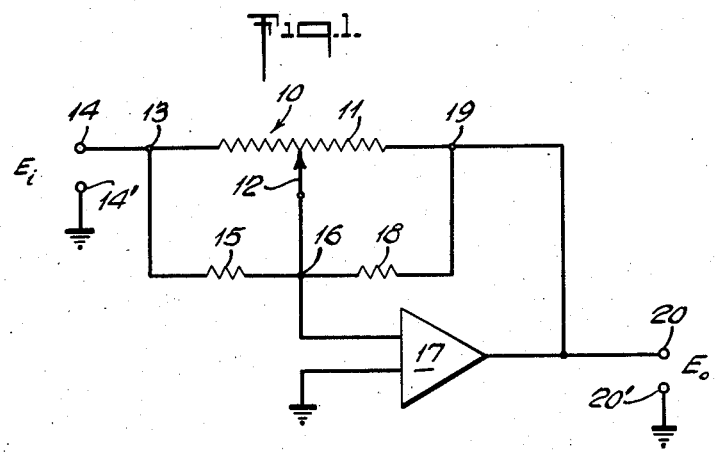
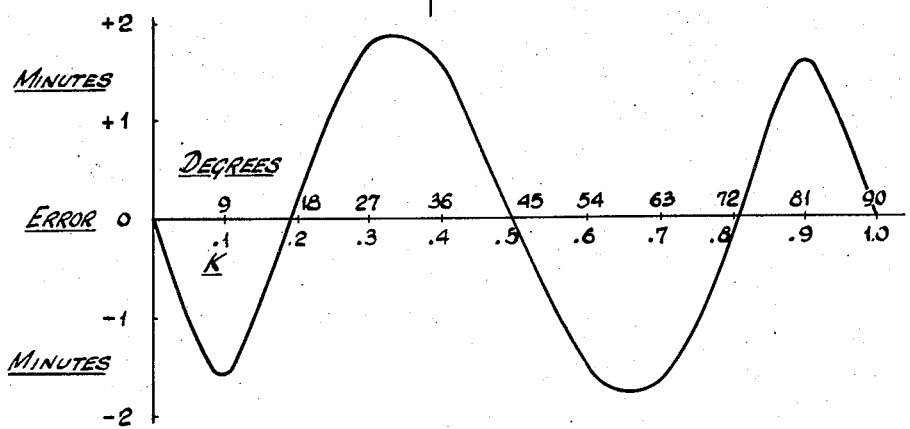
INVENTOR
PERRY A. SEAY
BY
Burgess, Ryan + Hicks
ATTORNEYS

United States Patent Office 2,948,474
Patented Aug. 9, 1960

2,948,474

TANGENT COMPUTER CIRCUIT

Perry A. Seay, Flushing, N.Y., assignor to Reeves Instrument Corporation, New York, N.Y., a corporation of New York Filed July 12, 1954, Ser. No. 442,461

9 Claims. (Cl. 235—197)

This invention relates to computing devices and more specifically to an improved system and apparatus for the performance of trigonometric operations.

In the design of electronic computers such as the analog computer and the like it is frequently desirable to perform many trigonometric functions. While a number of devices are presently available for computing sines and cosines, the computation of tangents to a high degree of accuracy has been accomplished only through the use of relatively expensive sine and cosine potentiometers, resolvers and the like. It is therefore one object of the invention to provide means for directly computing tangents and attaining high degrees of accuracy without entailing the complication and expense of prior systems.

Another object of the invention is a highly simplified tangent computer that may be used over any quadrant of 360 degrees.

Still another object of the invention is to provide a novel functional potentiometer for producing the tangent function.

The above and other objects and advantages of the invention will become more apparent from the following description and accompanying drawings forming part of this application.

In the drawings:

Fig. 1 is a schematic diagram of one embodiment of a tangent computer in accordance with the invention; and Fig. 2 is a curve showing the accuracy of the apparatus illustrated in Fig. 1.

The form of invention illustrated in the drawings comprises a potentiometer 10 having a resistance element 11 of linear taper and a movable contactor 12 which slidably contacts the element 11. One end terminal 13 of the potentiometer 10 is connected to an input terminal 14 and through a resistor 15 to a junction point 16. This junction 16 is also connected to the contactor arm 12, to the input of amplifier 17 and through resistor 18 to the right hand end terminal 19 of the potentiometer 10.

The remainder of the circuit includes connections between both the output of amplifier 17 and the potentiometer end terminal 19 to the output terminal 20 of the computer. The other computer output terminal 20' is grounded along with computer input terminal 14' and the amplifier 17.

With the circuits as described above, it will be observed that the resistor 18 and that part of the resistance element 11 between contactor 12 and terminal 19 comprise a feedback resistor for amplifier 17 while resistor 15 together with that part of the potentiometer resistance element 11 between contactor 12 and end terminal 13 forms a series input resistance for amplifier 17. Thus as the contactor 12 is shifted relative to the resistance element 11, resistance will be removed from the feedback circuit of amplifier 17 and placed in the input circuit or vice versa. This action modifies the gain of the amplifier and of course the ratio of the output signal measured at the output terminals 20 and 20' to the input signal applied to terminals 14 and 14'. With the use of the resistance network described above, this ratio corresponds to the tangent of an angle between 0° and 90° corresponding to the position of the contactor 12 relative to the resistance element 11. Since potentiometers normally embody arcuate resistance elements and a contactor including a central shaft for rotating it, the coordination of a given shaft rotation representing angle $\theta$ with displacement of the contactor merely involves the employment of suitable speed changing systems such as gear trains or the like well known in the art.

In order to simplify the explanation of this improved tangent computer consider the circuit of Fig. 1 with the resistors 15 and 18 omitted. It will be observed that when contactor 12 is at the mid-point of element 11, the amplifier feedback and input resistances will be equal and the gain of the amplifier will be unity. This of course accurately represents a tangent of 45°. When the contactor 12 is at end terminal 13, there is substantially zero input resistance (assuming negligible impedance of the signal source connected to terminals 14 and 14') and the feedback resistance will be maximum. This condition produces an output corresponding to the maximum gain of the amplifier. For infinite amplifier gain the tangent of 90° will therefore be approximated. Movement of the contactor to the end terminal 19 provides substantially zero feedback resistance and maximum input resistance and therefore closely approximates the tangent of 0°. It will be observed however that substantial error will be encountered when the contactor 12 is positioned at quarter positions representing for instance angles of 22½° and 67½°.

It has been found that through the employment of shunt resistors 15 and 18 connected as shown in Fig. 1, the error obtaining when the contactor 12 is in positions intermediate a mid position of element 11 and the end terminals thereof can be significantly reduced and the gain of the amplifier will then closely correspond to the tangent of $\theta$ at all positions of the contactor 12. Assuming that the resistance of element 11 is R, that the resistors 15 and 18 are each equal to 1.8R and that K represents a proportion of the total angular displacement of the contactor 12 relative to end terminal 19, then the gain of the amplifier may be expressed as follows:

$$\frac{E_o}{E_i} = \frac{-\dfrac{KR \times 1.8R}{KR + 1.8R}}{\dfrac{(1-K)R \times 1.8R}{(1-K)R + 1.8R}}$$

$$\frac{E_o}{E_i} = \frac{(2.8-K)K}{(1.8+K)(1-K)} = -\operatorname{Tan} \theta$$

where $\theta = 90° K$.

Fig. 2 shows an error curve obtained with a circuit having the constants set forth above. This curve is self-explanatory and indicates that maximum errors occur at approximately 27° and 63° (K equalling .3 and .7 respectively) and that these errors in each instance are less than 2 minutes. While the specific relationship between the resistors 11, 15 and 18 selected for the foregoing example is preferred, it is apparent that other values may be used to attain certain desired results. In addition the potentiometer 10 may be of any desired form depending upon the accuracy required. For instance it may be a helically wound device wherein the contactor 12 is moved through one or more revolutions to vary $\theta$ from zero to 90° or it may be a more conventional unit wherein the contactor 12 is rotatable through an angle of less than one revolution for the same change in $\theta$.

Under certain conditions it may be desirable to extend the computations through angles of zero to −90°. For this purpose any usual means may be employed such as an additional amplifier and associated switching arrangement.

While only one embodiment of the invention has been shown and described, it is apparent that changes, modifications and alterations may be made without departing from the true scope and spirit thereof.

What is claimed is:

1. A computing device comprising an amplifier having an input terminal, an output terminal, and a common terminal, a potentiometer having a pair of end terminals and a movable contactor, means connecting one end terminal of said potentiometer to the output terminal of said amplifier, means connecting said contactor to the input terminal of said amplifier, and a resistor connected between each end terminal of said potentiometer and said contactor, said computing device producing an output voltage between the output terminal of said amplifier and said common terminal varying substantially according to the tangent of the angular position of said contactor multiplied by the value of an applied input voltage between said other end terminal of said potentiometer and said common terminal.

2. A tangent computer comprising an amplifier having an input and output, a potentiometer including a pair of end terminals and a movable contactor, connections between one end terminal and the output of said amplifier and between the contactor and the input of said amplifier, a resistor connected between each end terminal and said contactor, said resistors each having a resistance approximately equal to 1.8 times the total resistance value of said potentiometer, and means for applying an input signal to the other end terminal whereby displacement of said contactor varies the magnitude of the signal appearing at the output of the amplifier in accordance with the tangent of an angle corresponding to said contactor displacement.

3. A tangent computer comprising in combination, an amplifier having an input terminal, an output terminal, and a common ground terminal, a linear potentiometer having first and second end terminals and a movable contact, means coupling one of said end terminals to the output terminal of said amplifier, means coupling said movable contact to the input terminal of said amplifier, a first fixed resistor coupled between said first end terminal and said movable contact, a second fixed resistor coupled between said second end terminal and said movable contact, and means adapted for coupling an applied voltage between said other end terminal and said common ground terminal.

4. The tangent computer as defined in claim 3 wherein the values of said first and second fixed resistors are substantially equal to 1.8 times the resistance between said first and second end terminals of said linear potentiometer.

5. A precision computing circuit comprising in combination, a high-gain amplifier, feedback means for varying the gain of the computing circuit according to a trigonometric function, said feedback means including a linear resistor element having first and second end terminals and a movable contact, a first fixed resistor coupled between said first end terminal and said movable contact, a second fixed resistor coupled between said second end terminal and said movable contact, means coupling one of said end terminals to the output of said amplifier, means coupling said movable contact to the input of said amplifier, and means adapted for coupling an applied voltage to the other end terminal of said linear resistor element.

6. The precision computing circuit as defined in claim 5 wherein the resistance of said first and second fixed resistors is substantially equal to 1.8 times the resistance of said linear resistor element, and wherein the gain of said computing circuit varies according to the tangent of $$\frac{\pi}{2}$$

multiplied by K, where K is the resistance of said linear resistor element between one of said end terminals and said movable contact divided by its total resistance between end terminals.

7. A functional potentiometer comprising in combination a linear resistance element having first and second end terminals and a movable contact engaging the resistance element, a first fixed resistor coupled between said first end terminal and said movable contact, a second fixed resistor coupled between said second end terminal and said movable contact, said first and second fixed resistors each having a resistance value substantially equal to 1.8 times the resistance of said linear resistance element between said first and second end terminals, the resistance between said first terminal and said movable contact of the functional potentiometer divided by the resistance between said second terminal and said movable contact varying substantially as the tangent of the angular position of said movable contact.

8. A tangent potentiometer comprising in combination a linear variable resistance element having first and second end terminals and a movable contact, a first fixed impedance element coupled between said first end terminal and said movable contact, a second fixed impedance element coupled between said second end terminal and said movable contact, said first and second fixed impedance elements each having an impedance value approximately equal to 1.8 times the resistance of said linear variable resistance element between said first and second end terminals.

9. A tangent computer comprising in combination, a high-gain amplifier having an input terminal, an output terminal, and a common terminal, a one-quadrant tangent potentiometer including a resistance element having first and second end terminals and a movable contact engaging the resistance element, the resistance between said first end terminal and said movable contact divided by the resistance between said second end terminal and said movable contact varying substantially as the tangent of the angular position of said movable contact, means connecting said first end terminal to the output terminal of said amplifier, means connecting said movable contact to the input terminal of said amplifier, and means adapted for coupling an applied voltage between said second end terminal and said common terminal.

References Cited in the file of this patent

UNITED STATES PATENTS

| | | |
|---|---|---|
| 2,467,646 | Agins | Apr. 19, 1949 |
| 2,598,312 | Schumard | May 27, 1952 |
| 2,738,924 | Preston et al. | Mar. 20, 1956 |
| 2,763,430 | Gray | Sept. 18, 1956 |
| 2,778,988 | Pihl | Jan. 22, 1957 |

OTHER REFERENCES

The Review of Scientific Instruments (Hofstader), August 1946; pages 298–300.

Electronic Instruments (Greenwood), pages 101 and 102; 1948.

Korn, G. A.: "Design and Construction of Universal Function Generating Potentiometers," The Review of Scientific Instruments, vol. 21, No. 1, January 1950.

Korn and Korn: "Electronics Analog Computers," McGraw-Hill, 1952 (pp. 121 and 263).